United States Patent
Chang

(10) Patent No.: US 7,859,775 B2
(45) Date of Patent: Dec. 28, 2010

(54) LENS MODULE

(75) Inventor: Keng-Ming Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/614,572

(22) Filed: Nov. 9, 2009

(65) Prior Publication Data

US 2010/0259840 A1    Oct. 14, 2010

(30) Foreign Application Priority Data

Apr. 8, 2009    (CN) .................. 2009 1 0301409

(51) Int. Cl.
*G02B 7/02* (2006.01)
(52) U.S. Cl. ...................... 359/819; 359/811
(58) Field of Classification Search .................. 359/819
See application file for complete search history.

(56) References Cited

U.S. PATENT DOCUMENTS

2007/0101796 A1* 5/2007 Tsai .............................. 72/387
2009/0316282 A1* 12/2009 Chang ......................... 359/819

* cited by examiner

*Primary Examiner*—Jordan M. Schwartz
*Assistant Examiner*—James C Jones
(74) *Attorney, Agent, or Firm*—Raymond J. Chew

(57) ABSTRACT

An exemplary lens module includes a lens barrel having a cavity defined therein and a groove defined in an inner sidewall thereof, and a deformable light blocking plate engaged in the groove of the lens barrel. The groove surrounds a central axis of the lens barrel. The deformable light blocking plate defines a central through hole therein for light passing therethrough.

19 Claims, 3 Drawing Sheets

LENS MODULE

BACKGROUND

1. Technical Field

The present disclosure relates to imaging technology, and particularly to lens modules.

2. Description of Related Art

Nowadays, lens modules have been widely used in various portable electronic devices such as digital cameras, mobile phones, etc. Lens modules used for portable electronic devices typically include a barrel, a plurality of lenses, a light blocking plate, a spacer, and so on. The barrel receives the lenses, the light blocking plate, and the spacer therein.

The light blocking plate is fixedly mounted in the barrel by using, for example, a glue/adhesive. When the glue/adhesive used to adhere the light blocking plate to the barrel is dilute, it can seep into the lens module due to capillary action, thus impairing imaging quality of the lens module.

Therefore, what is needed is a new lens module which can overcome the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
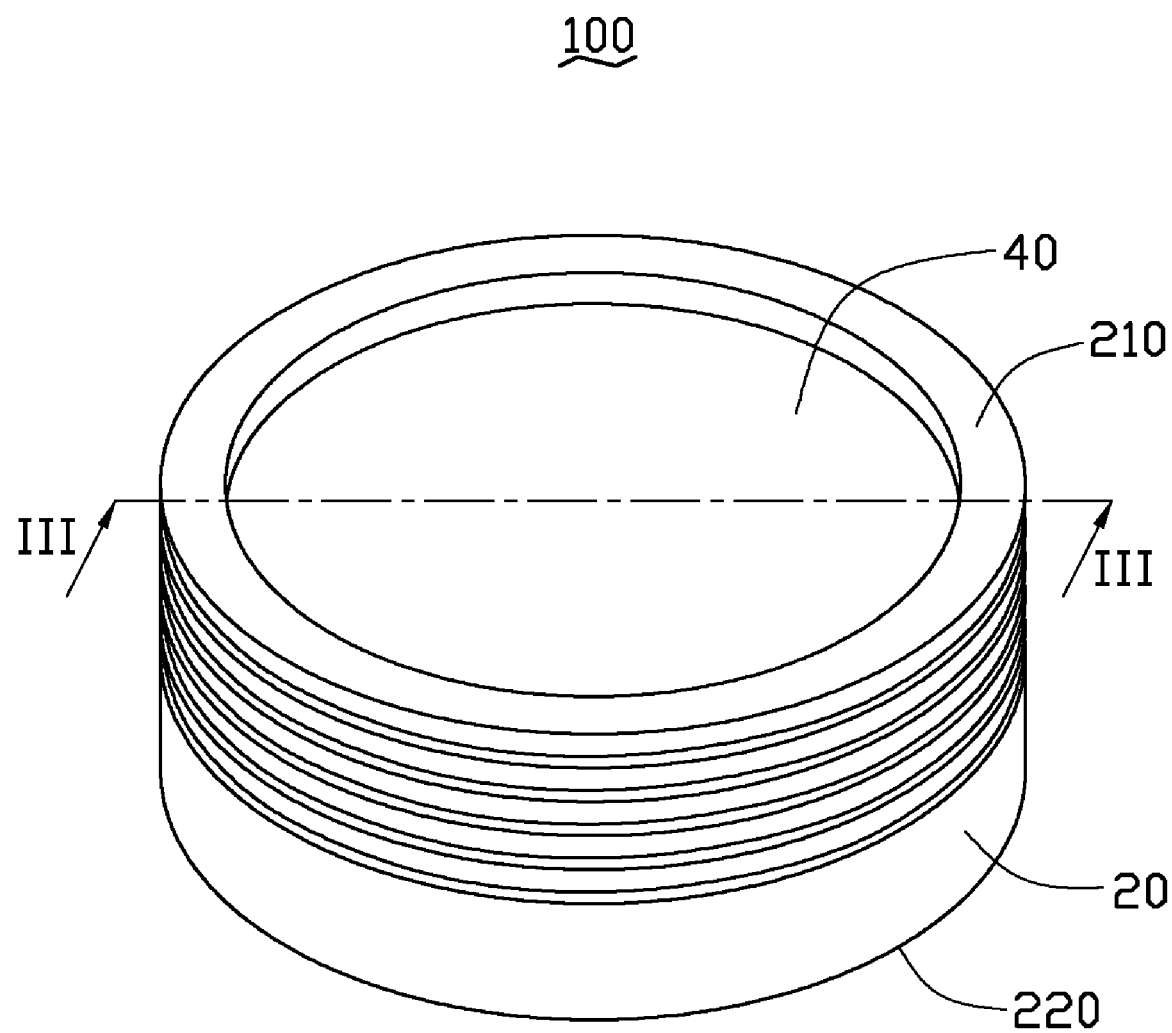
FIG. 1 is an isometric view of a lens module according to an exemplary embodiment.
Figure 2:
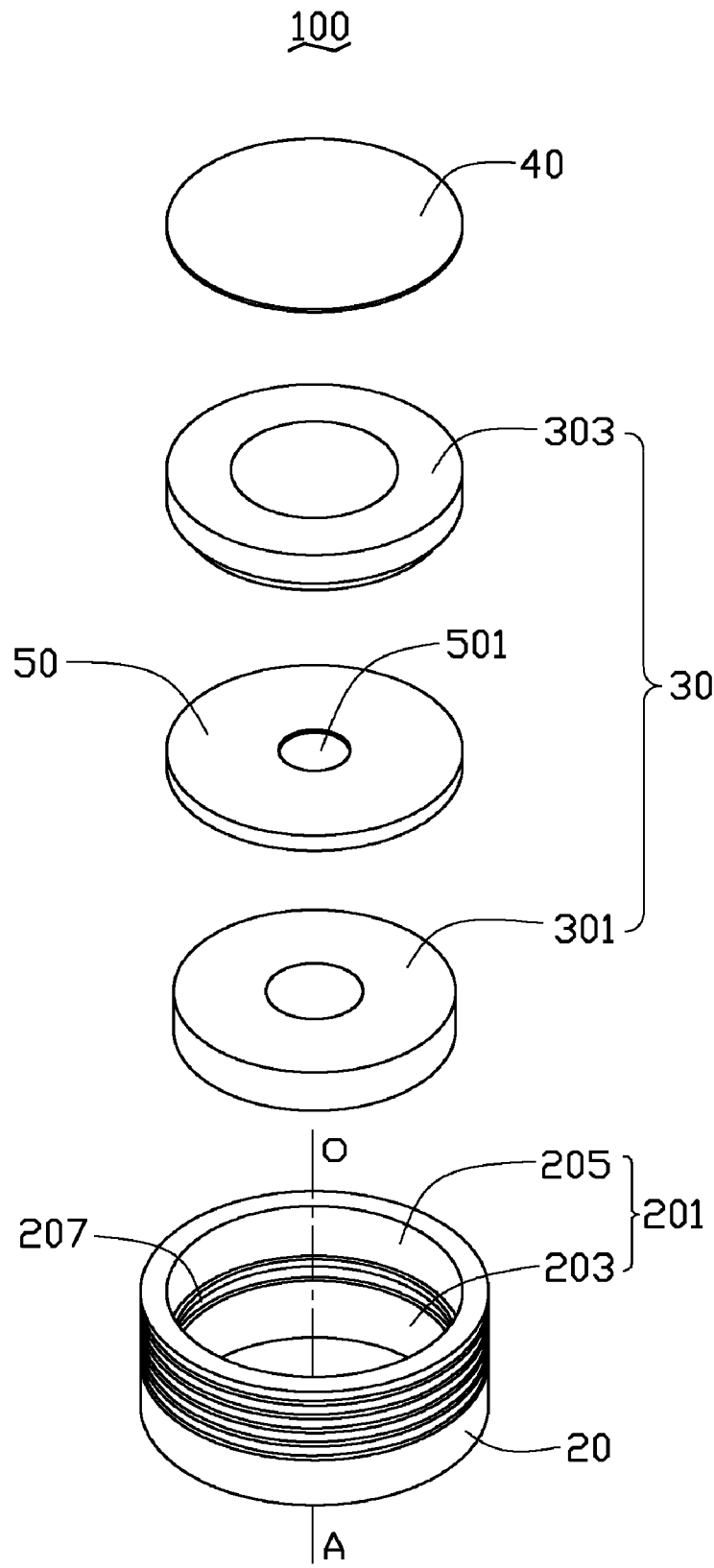
FIG. 2 is an exploded, isometric view of the lens module of FIG. 1.
Figure 3:
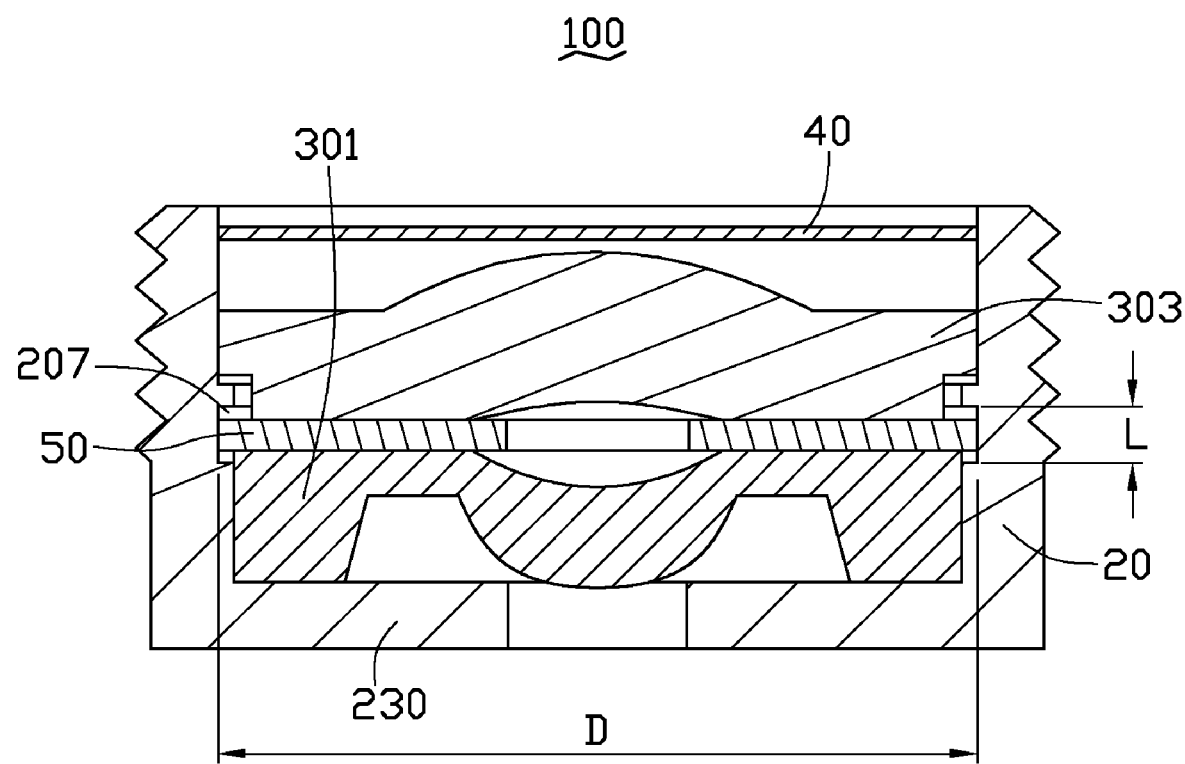
FIG. 3 is a sectional view of the lens module of FIG. 1, taken along a line III-III thereof.

Referring to FIGS. 1-3, a lens module 100, according to an exemplary embodiment, includes a lens barrel 20, a lens group 30, a filter 40, and a deformable light blocking plate 50. In the present embodiment, the lens group 30 includes a first lens 301, and a second lens 303. It is to be understood that lenses of any number and type could be used in the lens module 100.

The lens barrel 20 is substantially a hollow cylinder, having a first open end 210, an opposite second open end 220, and a lip 230 extending inward from a periphery of the second open end 220. The lens barrel 20 includes a stepped cylindrical cavity 201 therein. The cavity 201 has a small diameter cavity 203 adjacent to the second open end 220, and a large diameter cavity 205 adjacent to the first open end 210. The small diameter cavity 203 is configured for receiving the first lens 301 therein. The large diameter cavity 205 is configured for receiving the second lens 303 and the filter 40 therein.

An annular groove 207 is defined in an inner sidewall of the small diameter cavity 203, and surrounds a central axis OA of the lens barrel 20. The annular groove 207 is configured for receiving the deformable light blocking plate 50 therein. The width L of the annular groove 207 along a central axis of the lens barrel 20 is in a range from 0.1 to 0.3 millimeters (mm) In the present embodiment, the width L is 0.1 mm, and two surfaces of the deformable light blocking plate 50 respectively abut against the first and second lenses 301, 303. In alternative embodiment, the annular groove 207 may instead be defined in an inner side wall of the large diameter cavity 205. In other alternative embodiments, the width L may be instead be 0.15 mm, 0.25 mm, etc. It is to be understood that the width L may vary according to dimensions of the lens module 100.

The filter 40 is substantially disk-shaped. The filter 40 is received in the large diameter cavity 205 of the lens barrel 10 and above the second lens 303. The filter 40 is used to selectively transmit light having certain properties (often, a particular range of wavelengths, that is, range of colours of light), while blocking the remainder. In the present embodiment, the filter 40 is an infrared-cut filter. In other embodiments, the filter 40 may instead be an ultraviolet filter, a low pass filter, etc.

The deformable light blocking plate 50 is substantially ring-shaped, flexible i.e., deformable, and defines a central through hole 501 therein for light passing therethrough. The deformable light blocking plate 50 has an outer diameter equal to a diameter D of the annular groove 207, such that the deformable light blocking plate 50 can be stably secured in a plane perpendicular to the central axis of the lens barrel 20 when the deformable light blocking plate 50 is located in the annular groove 207. The deformable light blocking plate 50 has a thickness smaller than the width L of the annular groove 207, so that the deformable light blocking plate 50 can be received in the annular groove 207. The thickness of the deformable light blocking plate 50 is in a range from 0.03 to 0.05 mm. In the present embodiment, the deformable light blocking plate 50 is made of plastic with a thickness of 0.04 mm, and two surfaces of the deformable light blocking plate 50 respectively abut against the first and second lenses 301, 303.

In assembly of the lens module 100, the first lens 301 is firstly received in the small diameter cavity 203 of the lens barrel 10. Secondly, the deformable light blocking plate 50 aligns with the first open end 210 of the lens barrel 20, and an operator exerts a force on the deformable light blocking plate 50, such that the deformable light blocking plate 50 is slightly deformed to be inserted into the groove 207. Then, the second lens 303, and the filter 40 are received in the large diameter cavity 205 in that order, and the second lens 303 abuts against the deformable light blocking plate 50. At this time, the first lens 301, the deformable light blocking plate 50, the second lens 303, and the filter 40 are all received in the cavity 201 of the lens barrel 20. The lens module 100 is thus completely assembled.

In the above-described assembly processes, the deformable light blocking plate 50 is engaged in the annular groove 207. Therefore, there is no need to use a glue/adhesive, thereby avoiding contamination by glue/adhesive to the first and second lenses. Imaging quality of the lens module 100 can thus be improved.

In the above-described embodiments, the lens barrel 20, the first and second lenses 301, 303, the filter 40, and the deformable light blocking plate 50 are all round. In alternative embodiments, the lens barrel 20, the first and second lenses 301, 303, the filter 40, and the deformable light blocking plate 50 may instead be other shapes, for example, rectangle, triangle, etc.

In alternative embodiment, the lens barrel 20 may instead include a cylindrical cavity 201 only having a diameter therein.

In alternative embodiments, the filters 40 may instead be omitted.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope of the appended claims.

What is claimed is:

1. A lens module comprising:
   a lens barrel having a cavity defined therein and a groove defined in an inner sidewall thereof, the groove surrounding a central axis of the lens barrel, the lens barrel being a hollow cylinder having a first open end, and an opposite second open end, and a lip extending inward from a periphery of the second open end; and
   a deformable light blocking plate engaged in the groove of the lens barrel, the deformable light blocking plate defining a central through hole,
   wherein the lens barrel comprises a stepped cylindrical cavity therein, the stepped cylindrical cavity has a small diameter cavity adjacent to the second open end, and a large diameter cavity adjacent to the first open end, the groove is defined in an inner wall of the small diameter cavity.

2. The lens module of claim 1, further comprising a first lens and a second lens, wherein the first lens is received in the small diameter cavity, the second lens is received in the large diameter cavity, and the deformable light blocking plate is sandwiched between the first and second lenses.

3. The lens module of claim 2, further comprising a filter, wherein the filter is received in the lens barrel and adjacent to the second lens.

4. The lens module of claim 3, wherein the filter is disk-shaped.

5. The lens module of claim 3, wherein the filter is an infrared-cut filter, an ultraviolet filter, or a low pass filter.

6. The lens module of claim 1, further comprising a first lens and a second lens, the first and second lenses are received in the lens barrel, and the deformable light blocking plate is sandwiched between the first and second lenses.

7. The lens module of claim 6, further comprising a filter, wherein the filter is received in the lens barrel and adjacent to the second lens.

8. The lens module of claim 1, wherein the deformable light blocking plate is ring-shaped.

9. The lens module of claim 1, wherein an outer diameter of the deformable light blocking plate is equal to a diameter of the groove.

10. A lens module comprising:
    a lens barrel having a cavity defined therein and a groove defined in an inner sidewall thereof, the groove surrounding a central axis of the lens barrel, the lens barrel being a hollow cylinder having a first open end, and an opposite second open end, and a lip extending inward from a periphery of the second open end;
    a first lens received in the lens barrel;
    a second lens received in the lens barrel; and
    a deformable light blocking plate engaged in the groove of the lens barrel, and sandwiched between the first and second lenses,
    wherein the lens barrel comprises a stepped cylindrical cavity therein, the stepped cylindrical cavity has a small diameter cavity adjacent to the second open end, and a large diameter cavity adjacent to the first open end, the groove is defined in an inner wall of the small diameter cavity.

11. The lens module of claim 10, wherein the deformable light blocking plate is ring-shaped.

12. The lens module of claim 11, wherein an outer diameter of the deformable light blocking plate is equal to a diameter of the groove.

13. A lens module comprising:
    a lens barrel having a cavity defined therein and a groove defined in an inner sidewall thereof, the groove surrounding a central axis of the lens barrel, the lens barrel being a hollow cylinder having a first open end, and an opposite second open end, and a lip extending inward from a periphery of the second open end;
    a filter received in the lens barrel; and
    a deformable light blocking plate received in the groove of the lens barrel, with the deformable light blocking plate abutting the filter,
    wherein the lens barrel comprises a stepped cylindrical cavity therein, the stepped cylindrical cavity has a small diameter cavity adjacent to the second open end, and a large diameter cavity adjacent to the first open end, the groove is defined in an inner wall of the small diameter cavity.

14. The lens module of claim 13, wherein the deformable light blocking plate is ring-shaped.

15. The lens module of claim 14, wherein an outer diameter of the deformable light blocking plate is equal to a diameter of the groove.

16. The lens module of claim 13, wherein the filter is disk-shaped.

17. The lens module of claim 16, wherein the filter is an infrared-cut filter, an ultraviolet filter, or a low pass filter.

18. The lens module of claim 1, wherein the width of the groove along a central axis of the lens barrel is in a range from 0.1 to 0.3 millimeters.

19. The lens module of claim 13, wherein the width of the groove along a central axis of the lens barrel is in a range from 0.1 to 0.3 millimeters.

* * * * *